Oct. 27, 1970 — A. L. STINGL — 3,537,066
AIRCRAFT VISUAL APPROACH PATH INDICATOR
Filed Aug. 14, 1967
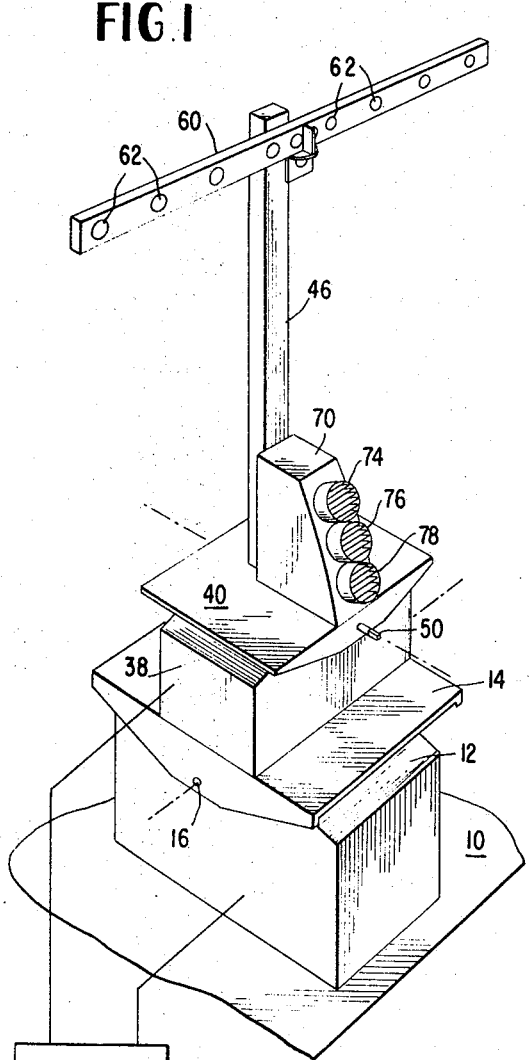
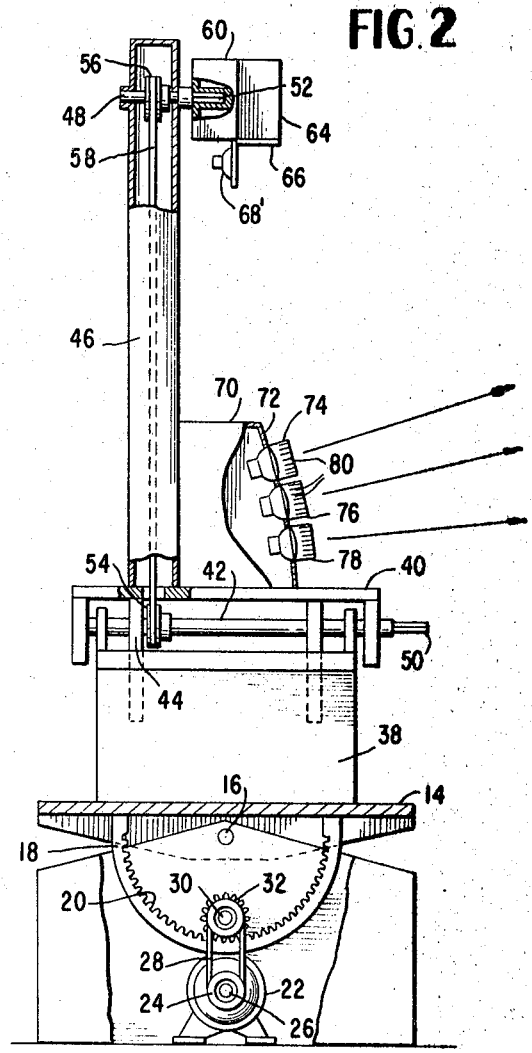
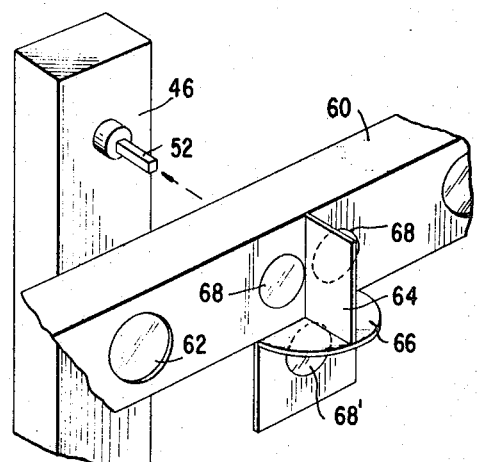
INVENTOR
A.L. STINGL
BY *Aughme, Rothwell, Mion, Zinn & Macpeak*
ATTORNEYS

United States Patent Office 3,537,066
Patented Oct. 27, 1970

3,537,066
AIRCRAFT VISUAL APPROACH PATH INDICATOR
Alfred Le Roy Stingl, P.O. Box 19225,
Washington, D.C. 20036
Continuation-in-part of application Ser. No. 629,191,
Apr. 7, 1967. This application Aug. 14, 1967, Ser.
No. 660,318
Int. Cl. G08g 5/00
U.S. Cl. 340—25     2 Claims

ABSTRACT OF THE DISCLOSURE

A visual approach path indicator comprising three light sources producing beams at different angles with respect to the horizontal mounted on a platform stabilized to compensate for the rolling and pitching motion of a ship.

RELATED APPLICATIONS

This is a continuation-in-part application based upon application Ser. No. 629,191 now Pat. No. 3,473,232 filed on Apr. 7, 1967 in the name of A. L. Stingl for "VTOL Aircraft Flight System" which in turn is a continuation-in-part application based upon application Ser. No. 625,243 filed Mar. 22, 1967 in the name of A. L. Stingl for "VTOL Aircraft Flight System."

BACKGROUND OF THE INVENTION

The present invention relates to a system for providing a safe visual approach path indication for landing aircraft of the vertical take-off and landing (VTOL) type on a ship at sea under night and marginal daylight flying conditions.

The present system is utilized in combination with the VTOL aircraft flight systems illustrated and described in the above-mentioned copending applications. The main purpose of the present system is to guide the aircraft along a proper flight path as it approaches the vicinity of the landing platform on the deck of the ship. The pilot may then utilize the systems described in the above-mentioned copending applications to assist him in hovering and landing operations.

As is well known, ships at sea are more and more being serviced by aircraft, especially VTOL aircraft, such as helicopters. Helicopters are employed to transfer personnel, mail and other cargo. In many cases the helicopters are also carried aboard naval vessels and are used for anti-submarine warfare, reconnaissance and rescue missions. In approaching a ship prior to the hovering and landing operations, it is often essential that the aircraft approach the ship along a predetermined flight path which will establish a predetermined safety margin over landing approach obstacles and eliminate over or under shooting the landing/hover area of a moving ship.

In prior operations involving the approach path of fixed wing aircraft to the flight deck of an aircraft carrier, a crewman having brightly colored or lighted paddles would be stationed to one side of the flight deck to indicate to the pilot through various arm motions whether the pilot was coming in too high or too low on his approach path. A system of this type is extremely subjective and the crewman's perspective of his position relative to the approaching aircraft is being varied continuously due to the pitch and roll motion of the ship.

The present invention, however, is designed to provide an objective lighting systems which will clearly indicate to an approaching pilot whether his approach path is too high or too low relative to the ship. The errors involving the pitch and roll of the ship are eliminated by stabilizing the platform upon which the lights are mounted by means of an automatic gyro control system to compensate for the pitching and rolling motion of the ship.

SUMMARY OF THE INVENTION

The present invention is directed to a visual approach path indicator comprising platform means adapted to be mounted on a ship, means for automatically stabilizing said platform means in a horizontal position regardless of the roll or pitch of the ship, light source means mounted on said platform means for providing a tri-colored beam of light of circular sections with each of said colored beams being disposed at a different angle relative to said horizontally disposed platform whereby an approaching pilot may maintain an aircraft on a predetermined flight path by maintaining visual contact with the middle beam of colored light.

Other features of the invention will be pointed out in the following description and claims and illustrated in the accompanying drawings, which disclose by way of example, the principles of the invention and the best mode which has been contemplated of applying those principles.

BRIEF DESCRIPTION OF THE DRAWING

FIG. 1 is a perspective view of the visual approach path indicator of the present invention;

FIG. 2 is a side elevational view, partly in section, of the device shown in FIG. 1, and FIG. 3 is an enlarged, exploded detail view showing the removability of the cross bar from the mast.

DETAILED DESCRIPTION OF THE INVENTION

In FIG. 1 of the drawings the base 10 may be the deck of a ship or any other suitable portion of the superstructure of the ship. An automatic pitch stabilization device 12 is mounted on the base 10. The pitch stabilization device 12 is provided with a platform 14 pivotally secured thereto on a shaft 16 which is disposed transversely with respect to the length of the ship. A semicircular gear segment 18 is secured to the underside of the platform 14 and is provided with gear teeth 20. A servo motor 22 is mounted within the device 12 and is provided with a pulley 24 secured to the shaft 26 of the motor. A belt 28 is entrained about the pulley 24 and a second pulley (not shown) on the shaft 30 which is journaled in the stabilization device 12 parallel to the shaft 26 of the motor 22. Also mounted on the shaft 30 is a pinion gear 32 which is disposed in meshing engagement with the gear teeth 20 of the gear segment 18.

The motor 22 is a reversible motor and is adapted to receive the forward and reverse control signals from a gyroscope 34 and an amplifier 36 shown schematically in FIG. 1. Thus the pitching action of the ship is sensed by the gyroscope which in turn provides the appropriate signal to the servo motor 22 to rotate the platform 14 to maintain the platform in a horizontal position.

Mounted on the platform 14 is a roll stabilization device 38 having a platform 40 pivotally mounted thereon by means of shaft 42. A semi-circular ring gear segment 44 is secured to the underside of the platform 40 in a manner similar to the arrangement of the gear segment 18 on the underside of the platform 14. A second servo motor and drive train (not shown) are provided in the roll stabilization device 38 to cooperate with the gear segment 44 in the same manner as the arrangement described above with respect to the pitch stabilization device 12. The shaft 42 is disposed at right angles to the shaft 16 and extends parallel to the length of the ship.

A mast or post 46 is secured to the upper surface of the platform 40 and is provided with a shaft 48 journalled in the upper end thereof parallel to the shaft 42. Both the shaft 42 and the shaft 48 protrude beyond the platform and the post and terminate in non-round end portions 50 and 52, respectively. A pulley 54 is mounted on the shaft 42 and a pulley 56 is mounted on the shaft 48. A belt 58 is entrained about both pulleys so that the shaft 48 will partake of the same movements of the shaft 42. A transverse bar 60 is provided with a non-round hole 62 which is complementary to and adapted to be received on the non-round end portions 50 and 52 of the shafts 42 and 48. The bar 60 may be mounted on either shaft and held thereon by a friction fit or any suitable detent, latch or snap-on arrangement. The two locations for the bar 60 provide the user with a certain amount of flexibility in mounting the entire package on a portion of the ship's superstructure and also overcomes by a considerable extent, the rotor downwash effect of the VTOL aircraft.

A plurality of lights 62 are mounted along the length of the bar 60 for night visibility and the bar itself is usually painted with a fluorescent orange safety paint for maximum daylight visibility. The bar 60 is maintained in a true horizontal position at all times due to the gyro control stabilization device 38 thereby providing the pilot of a hovering aircraft with a true horizontal reference member. This aspect of the invention is more fully set forth in applicant's copending application Ser. No. 625,243.

Also mounted on the bar 60 are a pair of flanges 64 and 66 arranged in a T-shaped configuration. A light 68 is mounted on either side of the vertically disposed flange 64 and a third light 69 is mounted below the horizontally extending flange 66 as best shown in FIG. 3. Thus, by flying the aircraft relative to the horizontal reference bar so that all of the lights 68 on the cross piece are within his view the pilot maintains a substantially horizontal attitude and also maintains an appropriate altitude and lateral position above the deck of the ship. This aspect of the invention is more fully set forth in applicant's copending application Ser. No. 629,191.

Turning now to the lighting arrangement comprising the visual approach path indicator, a housing 70 is loaded on the platform 40 at the base of the mast 46. The front of the housing is provided with an accurate face plate 72 having three lights 74, 76 and 78 mounted therein in vertical alignment with each other. A circular flange surrounds each light and a set of horizontal louvers is disposed within each circular flange in close proximity to the lights. The louvers 80 are so arranged that the light source behind the louvers is only visible along a direct visual path. The lowermost light 78 may be ared light and has a beam path disposed at an angle of 10 degrees relative to the platform 40. In this manner the red light cannot be seen by another surface craft when the ship is darkened. The light 76 may be a green light having a beam path at an angle to the platform 40 slightly greater than the angle of the red beam. The uppermost light 74 may be amber and provides a beam at an angle slightly greater than the angle of the green light beam relative to the platform 40.

Thus during an approach to the ship the pilot maintains his aircraft in a position so that the green light is visible at all times. Should the aircraft be too high above the prescribed flight path the pilot will see the amber light and should the flight path be too low a pilot will be able to see the red light. The beam height of the amber and red lights are approximately equal and the beam height of the green light is substantially less so that a more accurate approach path is obtained.

Obviously many modifications and variations of the present invention are possible in the light of the above teaching. It is therefore to be understood that within the scope of the appended claims the inventions may be practiced otherwise than is specifically described.

What is claimed is:

1. A visual approach path indicator adapted to be mounted on a ship for guiding an aircraft to a landing on the deck of said ship comprising platform means, means for automatically stabilizing said platform means in a horizontal plane regardless of the roll or pitch of the ship, light source means mounted on said platform means for providing at least one beam of light at an angle to said horizontal plane whereby an approaching pilot may maintain aircraft on a predetermined approach path by maintaining visual contact with said beams of light, post means mounted on and perpendicular to said platform means, first shaft means rotatably journaled in the upper end of said post means, second shaft means secured to said platform means and disposed parallel to said first shaft means, connecting means for imparting the movement of said second shaft means to said first shaft means and transverse bar means detachably secured on one of said first and second shaft means.

2. A visual approach path indicator as set forth in claim 1 further comprising light means mounted on said transverse bar means for nighttime landing operations.

References Cited

UNITED STATES PATENTS

| 2,968,023 | 1/1961 | Ferguson et al. | 340—26 |
| 2,975,400 | 3/1961 | Ferguson et al. | 340—26 |
| 3,091,751 | 5/1963 | Greenberg | 340—26 |

ALVIN H. WARING, Primary Examiner

U.S. Cl. X.R.

240—1.2